June 23, 1931.  L. A. PAINE  1,811,244

THERMAL ELECTRIC METER

Filed May 6, 1929

Inventor.
Louis A. Paine.
by H. J. S. Dennison
Atty.

Patented June 23, 1931

1,811,244

UNITED STATES PATENT OFFICE

LOUIS A. PAINE, OF TORONTO, ONTARIO, CANADA, ASSIGNOR, BY MESNE ASSIGNMENTS, TO THE LINCOLN METER COMPANY, INC., OF SPRINGFIELD, ILLINOIS

THERMAL ELECTRIC METER

Application filed May 6, 1929. Serial No. 360,692.

The principal objects of the invention are to overcome the undesirable temperature and power factor errors resulting from the conditions obtaining in the existing forms of thermal electric meters and to produce an instrument which with varying currents will give closer proportional results.

Further and important objects are to produce a structure which will be less liable to failure through improper insulation, and to materially reduce the cost of manufacture.

The principal feature of the invention consists in the novel use of a material of low heat conductivity for the inclosing of means thermally responsive to the flow of electric current, whereby the dissipation of heat following the law of emissivity will be materially reduced and a better efficiency obtained in producing a predetermined temperature rise to operate the indicator element.

In the accompanying drawings Figure 1 is a perspective view of a meter with the casing partly broken away.

Figure 5:
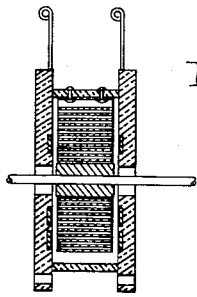
Figure 5 is a sectional detail of a slightly modified structure of heater plate.
Figure 1:
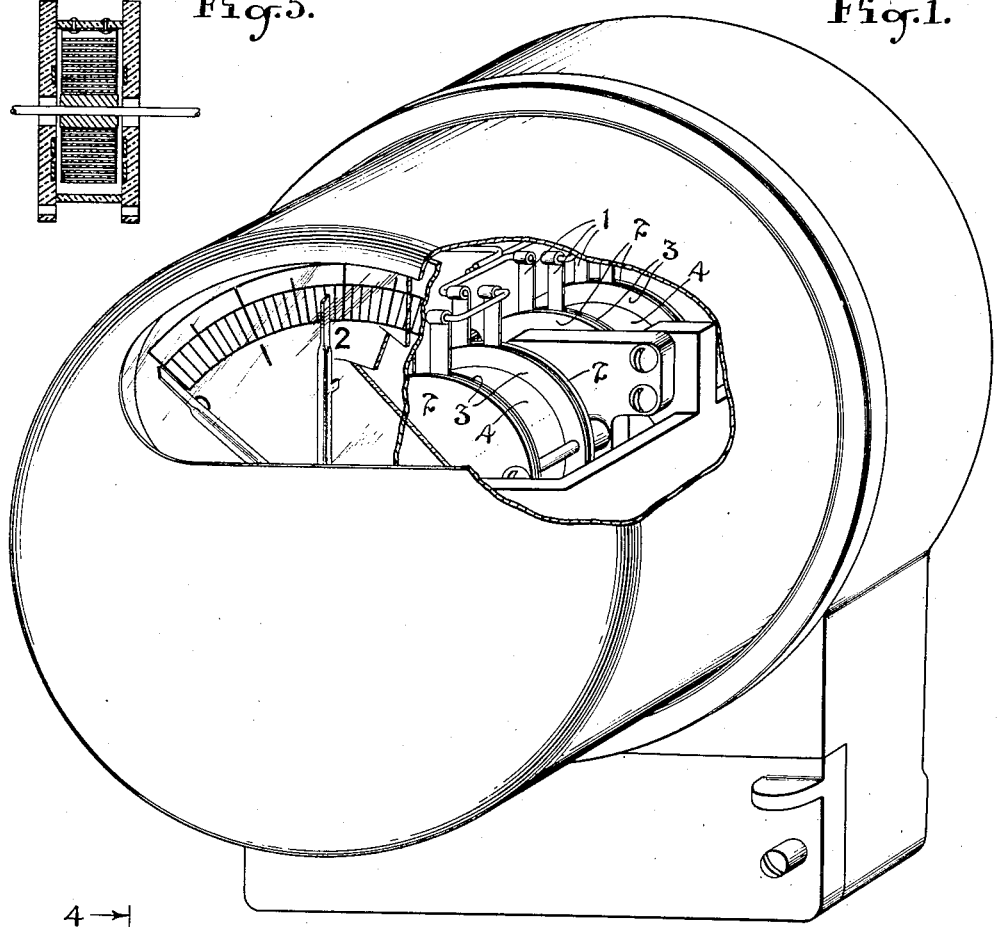

In the production of thermal electric meters it has been customary to electrically insulate and inclose the heater elements between metal plates and to house the thermostatic element connected with the indicator within a metallic casing arranged adjacent to the heaters.

In the operation of a thermal electric meter it is required that the temperature of the entire body be brought to a predetermined degree of heat in order to obtain the desired proportional result in the thermally responsive indicating element and it has been ascertained that very undesirable errors are existent because of the rapid changes due to emissivity from the metal inclosure and an excessive amount of energy is required to maintain the required temperature to effect the operation of the thermostatic element.

This invention accomplishes a very marked reduction in the errors due to the rapidity of radiation of heat from the metal structure and in the form of the invention herein shown the heating elements 1 are enclosed between plates 2 and 3 which are formed of a material having a very much lower heat conductivity value than metal, such for instance, as bakelite. The plates 2 are preferably thicker than the plates 3 which engage and close the ends of the cylindrical casings 4 which engage and close the ends of the cylindrical casings 4 which inclose the thermostatic elements 5 which operate proportionately in response to the heat generated by the heaters 1. The casings 4 are preferably formed of the same material as the plates 2.

It has been ascertained that meter structures having a thermal lagging of metal which has a very high co-efficient of heat conductivity have, to a very marked degree, the quality of instability or variability of heat dissipation and it has been definitely proven that to substitute for this metal lagging a lagging low in heat conductivity, the thermal insulation is higher and the heat dissipation is proportionately less.

The consequence of this condition is that the heater acts with better efficiency in obtaining a certain predetermined temperature rise to affect the thermostatic elements 5.

The invention is extremely simple but it has a remarkable effect in improving the stability and reliability of the result achieved.

In addition to the facts of reducing the variability of the heat dissipation and thereby producing much more desirable results, the adoption of a material having a lower heat conductivity value than metal, materially reduces the cost of construction. Such materials invariably have excellent electric insulating qualities which eliminates the necessity for many structural detail elements in the manufacture of the meter and also eliminates the probabilities of failure in electrical insulation.

The use of material of low heat conductivity for the purpose described enables the operation of the meter at much lower temperatures which of course reduces the proportionate heat loss and the transformers will be designed to deliver less current to the heaters and the heater resistance may be materially reduced.

Figure 2:
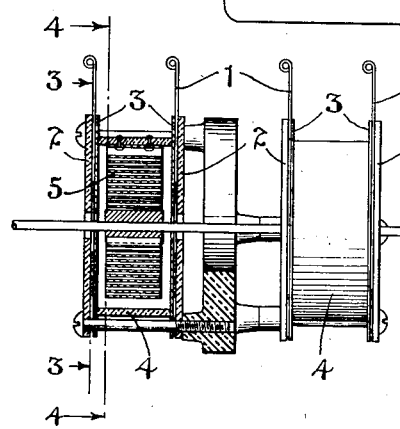
Figure 2 is an elevation and part section of the thermal element.
Figure 3:
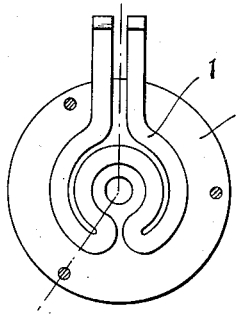
Figure 3 is a cross section through the line 3—3 of Figure 2.
Figure 4:
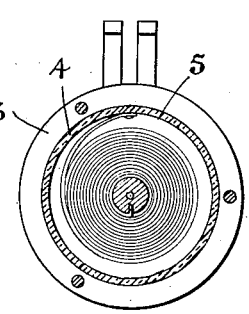
Figure 4 is a cross section through the line 4—4 of Figure 2.

The heaters are shown in Figure 2 as being enclosed between a pair of plates of insulating material but the heaters may be imbedded in an insulating plate as shown in Figure 5 so that an inner plate may be dispensed with.

What I claim as my invention is:

1. A thermal electric meter, comprising a chamber enclosed by heat insulating material, means thermally responsive to the flow of electric current enclosed within said chamber and affected only by the temperature therein, and means for registering only the thermal changes within said chamber, whereby power factor and temperature errors are reduced.

2. A thermal electric meter, comprising a chamber enclosed by heat insulating material, means thermally and differentially responsive to the flow of electric current enclosed within said chamber and affected only by the temperature therein, and means for registering only the thermal changes within said chamber, whereby power factor and temperature errors are reduced.

3. A thermal electric meter, comprising a chamber enclosed by heat insulating material, an electric heater embedded within the wall of said chamber, a thermostatic element arranged in said chamber, and means for registering the movement of said thermostatic member in response to the heat effected by the current flow, whereby power factor and temperature errors are reduced.

4. A thermal electric meter, comprising a chamber enclosed by heat insulating material, heaters embedded in two opposite walls of said chamber, a thermostatic element arranged in said chamber between said heaters, and means for registering the movement of said thermostatic member in response to the heat created by the current flow, whereby power factor and temperature errors are reduced.

5. In a thermal electric meter, the combination of a pair of heat insulating casings, a thermally responsive element in each of said casings, and electrically influenced means for creating independent temperature conditions within said respective casings in proportion to the flow of electrical current, whereby power factor and temperature errors are reduced.

6. In a thermal electric meter, the combination of a pair of heat insulating casings, a thermally responsive element in each of said casings, and electric heaters arranged to control the temperature conditions within the respective casings, said heaters being adapted to be differentially energized to affect the relative temperatures of said casings, whereby power factor and temperature errors are reduced.

LOUIS A. PAINE.